(12) United States Patent
Valentine et al.

(10) Patent No.: US 8,151,697 B2
(45) Date of Patent: Apr. 10, 2012

(54) SELF-CLEANING ROTISSERIE OVEN WITH FAN SHAFT SEAL ARRANGEMENT

(75) Inventors: Richard D. Valentine, Hillsboro, OH (US); Matthew A. Weber, Springboro, OH (US); James M. Heiser, Hillsboro, OH (US)

(73) Assignee: Premark FEG L.L.C., Wilmington, DE (US)

( * ) Notice: Subject to any disclaimer, the term of this patent is extended or adjusted under 35 U.S.C. 154(b) by 687 days.

(21) Appl. No.: 12/324,110

(22) Filed: Dec. 17, 2008

(65) Prior Publication Data

US 2009/0178578 A1 Jul. 16, 2009

Related U.S. Application Data

(60) Provisional application No. 61/021,114, filed on Jan. 15, 2008.

(51) Int. Cl.
*A47J 37/06* (2006.01)
(52) U.S. Cl. ..................................................... 99/421 H
(58) Field of Classification Search ................. 99/421 P, 99/421 HV, 421 HH; 464/89, 75; 454/209; 428/339; 415/246; 384/414; 310/166, 156.38; 277/594, 592, 415, 407, 315, 637, 601; 219/743, 219/741, 684, 683, 682, 681, 400; 134/24, 134/172; 126/21 A, 200, 1 R, 19 R, 198
See application file for complete search history.

(56) References Cited

U.S. PATENT DOCUMENTS

| | | | |
|---|---|---|---|
| 2,017,663 A | 10/1935 | Lahn | |
| 2,519,756 A * | 8/1950 | Hadley et al. | 384/153 |
| 2,558,589 A * | 6/1951 | Skolfield | 464/89 |
| 3,135,886 A * | 6/1964 | Kavanaugh | 310/112 |
| 3,261,554 A | 7/1966 | Perl | |
| 3,333,531 A | 8/1967 | Reuther | |
| 3,373,754 A | 3/1968 | Squire | |
| 3,467,847 A * | 9/1969 | Faulhaber | 310/266 |

(Continued)

FOREIGN PATENT DOCUMENTS

DE 2006622 8/1971

(Continued)

OTHER PUBLICATIONS

Non-Final Office Action, mailed Oct. 7, 2010; U.S. Appl. No. 12/324,333; USPTO; 13 pages.

(Continued)

*Primary Examiner* — Alvin Hunter
*Assistant Examiner* — M Chambers
(74) *Attorney, Agent, or Firm* — Thompson Hine LLP (57) ABSTRACT

A self-cleaning rotisserie oven includes a cooking cabinet comprising an internal bottom wall, an internal top wall and internal side walls thereby defining a cooking chamber. A self-cleaning system is provided for cleaning the cooking chamber. A convection system includes a heating element and ventilation system configured to heat the cooking chamber. The ventilation system includes a motor, a fan including a fan shaft connected to the motor such that the motor drives the fan and a bushing including a central channel that receives the fan shaft. The central channel includes an inner surface having a variable inner diameter along an axial length of the bushing such that a first portion of the inner surface is near the fan shaft and a second portion of the inner surface is further from the fan shaft than the first portion.

17 Claims, 5 Drawing Sheets

U.S. PATENT DOCUMENTS

| | | | |
|---|---|---|---|
| 3,550,576 | A | 12/1970 | Saver |
| 3,698,377 | A | 10/1972 | Smith |
| 3,854,762 | A | 12/1974 | Spiegel et al. |
| 3,951,683 | A | 4/1976 | Jarvis et al. |
| 3,951,684 | A * | 4/1976 | LaPrad et al. ............ 134/144 |
| 3,986,891 | A | 10/1976 | Rumbaugh |
| 4,353,559 | A | 10/1982 | Budzich et al. |
| 4,380,248 | A | 4/1983 | Ambrus et al. |
| 4,429,204 | A * | 1/1984 | McGuire et al. ............ 219/751 |
| 4,438,685 | A | 3/1984 | Haas, Sr. et al. |
| 4,442,143 | A | 4/1984 | Reed |
| 4,620,490 | A | 11/1986 | Brady et al. |
| 4,646,713 | A | 3/1987 | Honigsbaum |
| 4,741,809 | A | 5/1988 | Becker et al. |
| 4,800,824 | A | 1/1989 | DiFonzo |
| 4,998,550 | A | 3/1991 | Archambault |
| 5,085,443 | A | 2/1992 | Richards |
| 5,137,041 | A | 8/1992 | Hall |
| 5,191,831 | A | 3/1993 | Walden |
| 5,201,682 | A | 4/1993 | Nakagawa et al. |
| 5,377,784 | A | 1/1995 | Walkowiak et al. |
| 5,451,744 | A | 9/1995 | Koopman et al. |
| 5,485,780 | A * | 1/1996 | Koether et al. ............ 99/419 |
| 5,499,577 | A | 3/1996 | Tommasini |
| 5,560,694 | A | 10/1996 | Banicevic et al. |
| 5,678,430 | A | 10/1997 | Merlin et al. |
| 5,704,278 | A | 1/1998 | Cross |
| 5,765,838 | A | 6/1998 | Ueda et al. |
| 6,131,559 | A | 10/2000 | Norris et al. |
| 6,182,561 | B1 | 2/2001 | Garner et al. |
| 6,205,913 | B1 | 3/2001 | Zittel et al. |
| 6,318,245 | B1 | 11/2001 | Durth et al. |
| 6,330,855 | B2 | 12/2001 | Backus et al. |
| 6,405,738 | B1 | 6/2002 | Clark et al. |
| 6,410,890 | B1 | 6/2002 | Kohlstrung |
| 6,478,034 | B1 | 11/2002 | Durth et al. |
| 6,595,112 | B2 | 7/2003 | Durth |
| 6,622,754 | B1 | 9/2003 | Roth et al. |
| 6,626,190 | B2 | 9/2003 | Durth et al. |
| 6,772,751 | B2 | 8/2004 | Deuringer et al. |
| 6,904,904 | B2 | 6/2005 | Walther et al. |
| 7,060,942 | B2 * | 6/2006 | Friedl et al. ............ 219/411 |
| 7,157,668 | B2 | 1/2007 | Bartelick |
| 2003/0000515 | A1 | 1/2003 | Cole et al. |
| 2003/0070799 | A1 | 4/2003 | Mueller et al. |
| 2004/0055477 | A1 | 3/2004 | Swank et al. |
| 2004/0098292 | A1 | 5/2004 | Miller et al. |
| 2004/0142082 | A1 | 7/2004 | Friedl et al. |
| 2004/0163635 | A1 * | 8/2004 | Thorneywork ............ 126/21 A |
| 2005/0006436 | A1 | 1/2005 | Jordens et al. |
| 2005/0022314 | A1 | 2/2005 | Ambuter et al. |
| 2005/0022676 | A1 * | 2/2005 | Swank et al. ............ 99/419 |
| 2005/0076900 | A1 | 4/2005 | Walther et al. |
| 2005/0155498 | A1 | 7/2005 | Killion |
| 2005/0199616 | A1 | 9/2005 | Stahli |
| 2006/0054155 | A1 | 3/2006 | Bujeau et al. |
| 2006/0081593 | A1 | 4/2006 | Benoit et al. |
| 2006/0124627 | A1 | 6/2006 | Friedl et al. |
| 2006/0179583 | A1 | 8/2006 | Ambuter et al. |
| 2006/0196495 | A1 | 9/2006 | Kim et al. |
| 2006/0237425 | A1 | 10/2006 | Kim et al. |
| 2006/0284064 | A1 | 12/2006 | Liu et al. |
| 2007/0272682 | A1 | 11/2007 | Chin |
| 2008/0223357 | A1 | 9/2008 | Bartelick et al. |
| 2008/0280040 | A1 | 11/2008 | Barrall et al. |
| 2009/0178578 | A1 * | 7/2009 | Valentine et al. ............ 99/421 H |

FOREIGN PATENT DOCUMENTS

| | | |
|---|---|---|
| DE | 2842771 | 4/1980 |
| DE | 3114951 | 11/1982 |
| DE | 3820572 | 12/1989 |
| DE | 4007198 | 10/1991 |
| DE | 19950920 | 5/2001 |
| DE | 10156419 | 6/2003 |
| DE | 102004006973 | 10/2004 |
| DE | 102006010460 | 9/2007 |
| EP | 0310741 | 4/1989 |
| EP | 0401173 | 12/1990 |
| EP | 0532393 | 3/1993 |
| EP | 0652405 | 5/1995 |
| EP | 0786630 | 7/1997 |
| WO | 2005/024308 | 3/2005 |

OTHER PUBLICATIONS

Abstract—DE 2842771—Lechmetall Landsberg GMBH, Vorrichtung Und Verfahren Zur Waermebehandlung Von Mahrungsmitteln, Insbesondere Zur Zubereitung Von Speissen, publication date: Apr. 10, 1980.

PCT, International Search Report and Written Opinion, International Application No. PCT/US2009/030270, 12 pages (Mar. 12, 2010).

PCT, International Preliminary Report on Patentability, International Application No. PCT/US2009/030270 (Jul. 29, 2010).

* cited by examiner

SELF-CLEANING ROTISSERIE OVEN WITH FAN SHAFT SEAL ARRANGEMENT

CROSS REFERENCE TO RELATED APPLICATIONS

This application claims the benefit of U.S. Application No. 61/021,114, filed Jan. 15, 2008, the details of which are hereby incorporated by reference as if fully set forth herein.

TECHNICAL FIELD

This application relates generally to ovens used for cooking food product and, more specifically, to a rotisserie oven with a fan shaft arrangement that limits moisture migration to the fan motor.

BACKGROUND

Various types of ovens are used for cooking food product. Rotisserie ovens are commonly used in the retail environment to cook chickens and other food products in a manner that permits store customers to view the food product during cooking. Rotisserie style cooking tends to result in grease, juices and food particles within the oven that require the oven to be cleaned regularly. Many commercial ovens use fans to circulate heated air through the cooking cavity. During operation various vapors/liquids can migrate up the fan drive shaft, which may negatively impact motor life. The addition of a cleaning cycle using liquids increases the potential for problems. It would be desirable to provide an oven with a suitable fan shaft arrangement that limits moisture migration to the fan motor.

SUMMARY

In one aspect, a self-cleaning rotisserie oven includes a shaft arrangement with an associated labyrinth path and an o-ring that acts to fling water away from the fan shaft.

In another aspect, a self-cleaning rotisserie oven includes a cooking cabinet comprising an internal bottom wall, an internal top wall and internal side walls thereby defining a cooking chamber. A self-cleaning system is provided for cleaning the cooking chamber. A convection system includes a heating element and ventilation system configured to heat the cooking chamber. The ventilation system includes a motor, a fan including a fan shaft connected to the motor such that the motor drives the fan and a bushing including a central channel that receives the fan shaft. The central channel includes an inner surface having a variable inner diameter along an axial length of the bushing such that a first portion of the inner surface is near the fan shaft and a second portion of the inner surface is further from the fan shaft than the first portion.

In another aspect, a self-cleaning rotisserie oven includes a cooking cabinet comprising an internal bottom wall, an internal top wall and internal side walls thereby defining a cooking chamber. A rotor is located in the cooking chamber. A self-cleaning system is provided for cleaning the cooking chamber. A fan motor is located on a fan support located above the internal top wall of the cooking chamber. A fan includes a fan shaft connected to the motor such that the motor drives the fan. The fan shaft extends through an opening in the fan support and an opening in the top wall. A nut member is attached to a cooking chamber facing surface of the fan support. The nut member has an opening extending therethrough aligned with the opening in the fan support such that the fan shaft passes through the opening in the nut member. A bushing is threadably connected to the nut and has a channel through which the fan shaft passes. The bushing extends through the opening in the top wall and including a radially extending flange located adjacent an oven chamber facing surface of the top wall.

In another aspect, a method of inhibiting leak along a fan shaft within a self-cleaning rotisserie oven including a cooking cabinet comprising an internal bottom wall, an internal top wall and internal side walls thereby defining a cooking chamber, a rotor located in the cooking chamber and a self-cleaning system for cleaning the cooking chamber is provided. The method includes supporting a fan motor on a fan support located above the internal top wall of the cooking chamber. A fan shaft is operatively connected to the fan motor. The fan shaft extends through an opening in the fan support and through an opening in the top wall. The fan shaft is located within a channel in a bushing. The bushing is inserted through the opening in the top wall by moving the bushing along an axis of the fan shaft. The channel of the bushing includes an inner surface having a variable inner diameter along an axial length of the bushing such that a first portion of the inner surface is near the fan shaft and a second portion of the inner surface is further from the fan shaft than the first portion.

DETAILED DESCRIPTION

Figure 1:
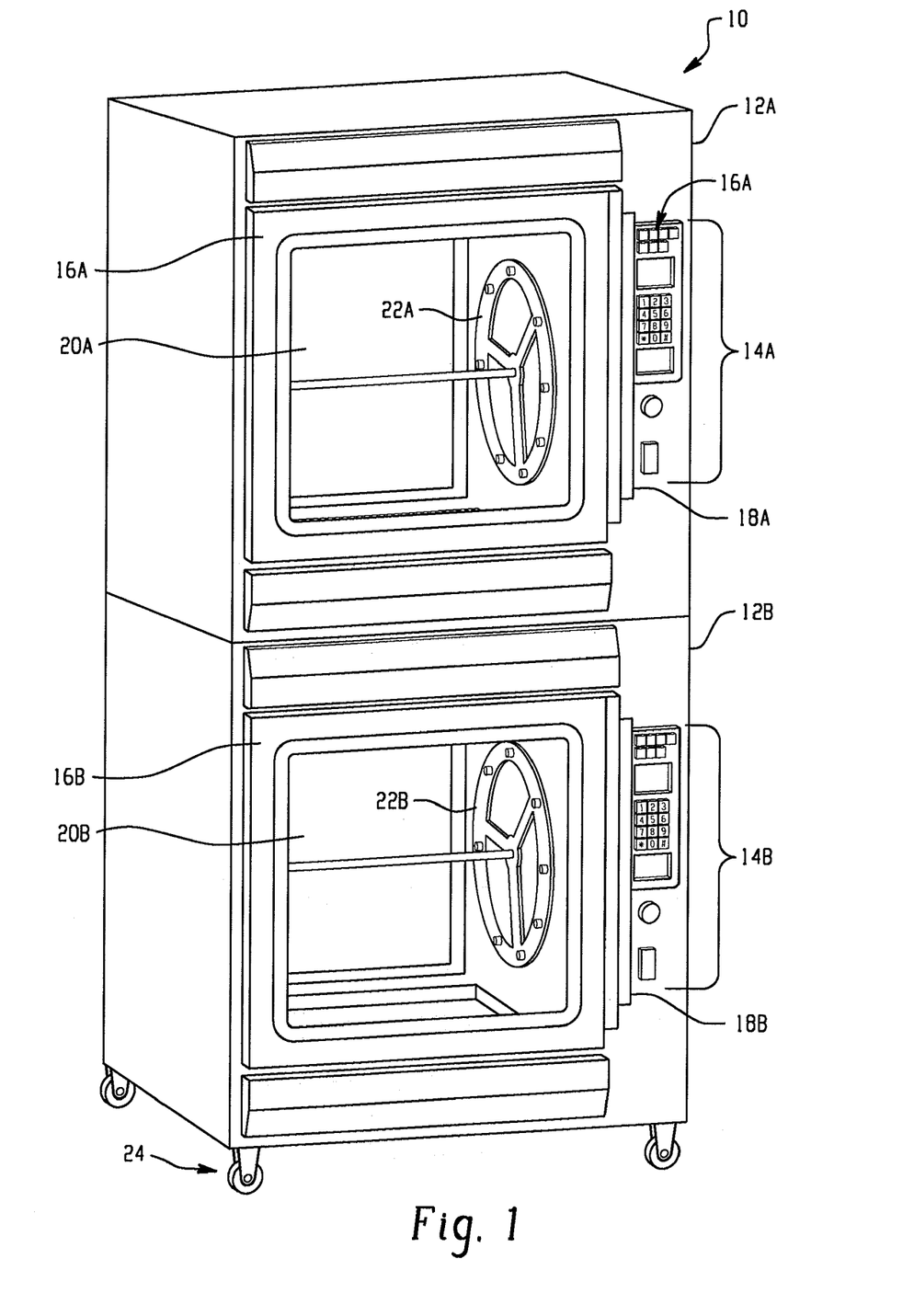
FIG. 1 is a front perspective of a rotisserie system.
Figure 2:
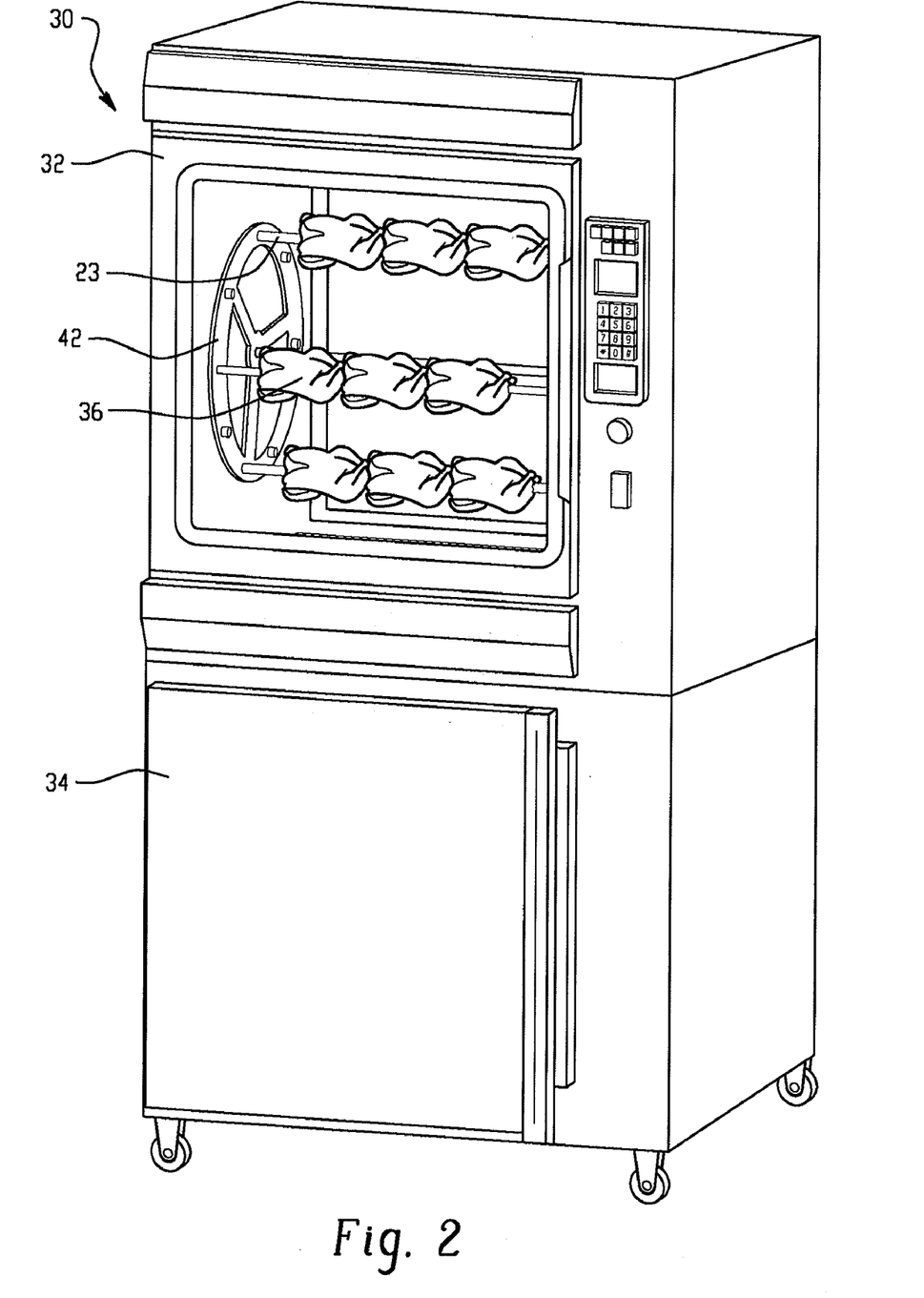
FIG. 2 is a front perspective of another embodiment of a rotisserie system.

Referring to FIG. 1, a rotisserie system 10 is shown including a rotisserie oven 12A stacked atop another rotisserie oven 12B. Each oven includes a respective control interface 14A, 14B, which may include a variety of components, such as an information display area, a numeric keypad, ON/OFF buttons/keys, function specific buttons/keys, and/or various indicator lights. Each oven includes a vertically hinged access door 16A, 16B with a respective handle 18A, 18B and glass front 20A, 20B for viewing the rotisserie operation. The rear side of the oven may also include a viewing window, and in some cases may be formed by a rear door. A rotor 22A, 22B within each oven is also shown. The rotor 22A and 22B carry an number of spits 23 (FIG. 2) that carry food product. The illustrated system is supported by wheels 24 for ease in repositioning the system, with one or more of the wheels 24 including a lock feature. Referring to FIG. 2, a rotisserie system 30 is shown with a single oven 32 stacked atop a lower cabinet 34. The spit 23 within oven 32 includes birds 36 loaded thereon as per a typical rotisserie cooking operation. In other embodiments, the rotor 22 carries baskets (not shown) that can hold the birds 36.

Figure 3:
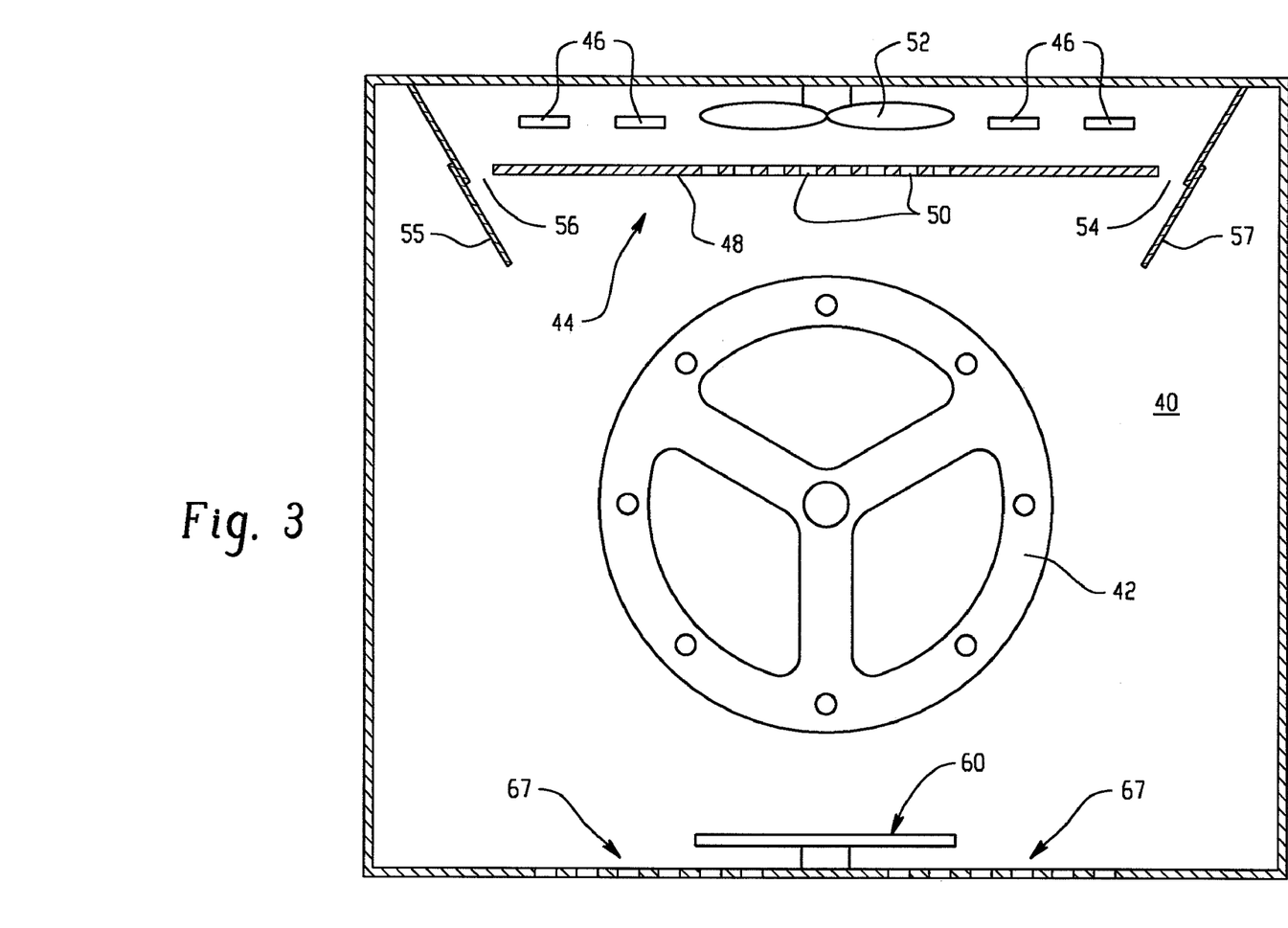
FIG. 3 is a schematic side view of one embodiment of a cooking chamber.

FIG. 3 is a side view layout showing an exemplary oven chamber 40. During rotisserie cooking operations, the rotor 42 rotates as heat is generated by a heating system 44. In the illustrated embodiment, the heating system 44 is formed by heating elements 46 located above an upper plate or shield 48. The plate 48 includes one or more intake openings 50 with associated convection fans 52 arranged to draw air into the openings 50 from the chamber 40. The fans 52 push the air forward and rearward and across the heating elements 46 to pick up heat. The heated air is then directed back into the chamber 40 at forward and rearward slots 54 and 56. Baffles 55 and 57 guide the air inward toward the rotor 42 at the center of the chamber 40 as the heated air passes through the ventilation slots 54 and 56. The space above the plate 48 may include other directional plates or baffles to more effectively produce the forward and rearward air flow.

The rotisserie oven includes a self-cleaning feature that enables the oven to be cleaned during a self-cleaning mode of operation. For this purpose the oven may generally have hook-ups to a source of water and cleaning agent, and may also include a drain path and hook-up to enable the cleaning water to be purged during various points of the cleaning operation. The cleaning operation may include one or more stages, including pre-wash, wash and/or rinse stages. Different cleaning modes (e.g., which may provide different levels of cleaning) may be provided for user selection based upon the user's observation of how clean or dirty the oven is prior to cleaning.

Figure 4:
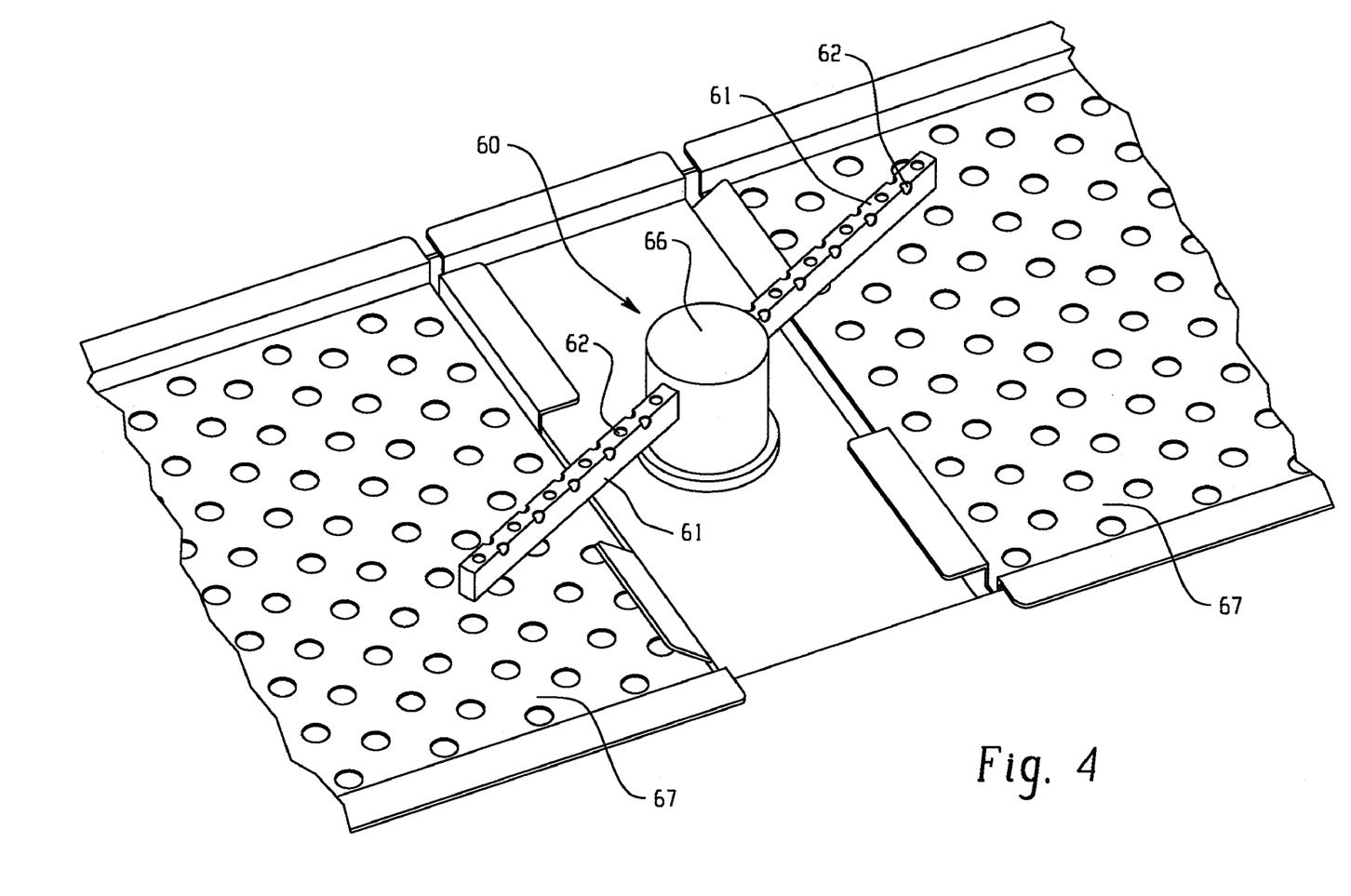
FIG. 4 shows a floor of a cooking chamber including a spray arm assembly and drain manifolds.

In one implementation the self-cleaning feature includes the use of a spray arm assembly 60, shown in FIG. 3 at a bottom portion of the cooking chamber 40. As shown in FIG. 4, the spray arm assembly 60 includes a rotatable spray arm hub 66 upon which is mounted one or more spray arms 61. Each spray arm 61 includes a multiplicity of nozzle openings 62 for ejecting sprays of water during cleaning, and the force of the ejected water urges each arm 61 to rotate. Water is evacuated from the bottom of the chamber 40 through use of the drain manifolds 67, which lead to a lower sump area where cleaning liquid collects for recirculation via a pump. Other stationary and/or rotating wash arms and/or nozzles could also be located elsewhere within the oven chamber 40 and/or above the plate 48.

Figure 5:
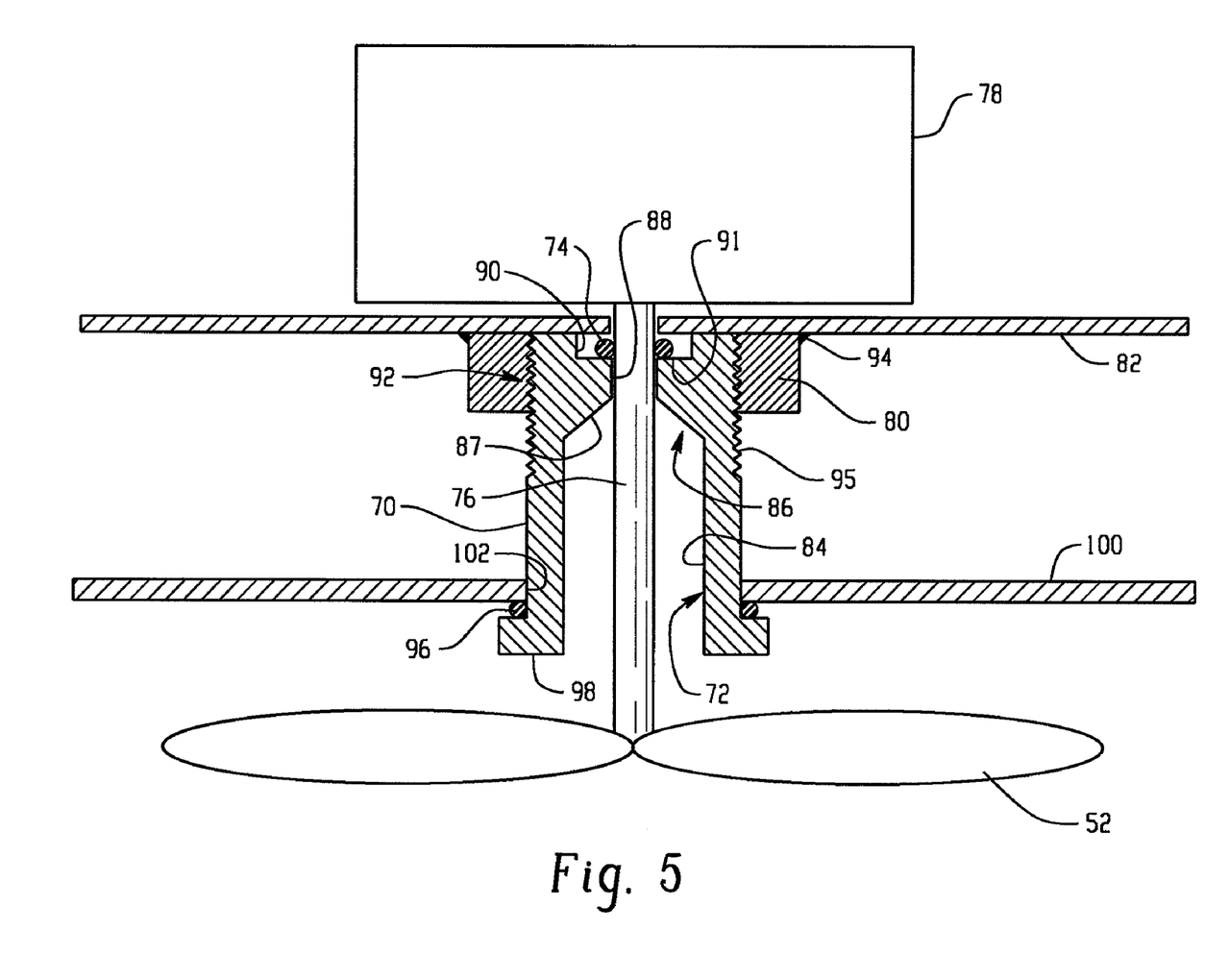
FIG. 5 shows a fan shaft arrangement.

Referring to FIG. 5, in one embodiment a bushing 70 has several changes in its internal contour 72 that act as labyrinths impeding travel of vapors and fluid toward a fan motor 78. The changes in contour 72 coupled with the length of the bushing 70 significantly slow a spray or splash of liquid to the point that gravity takes over and liquids do not reach the motor 78.

In the illustrated embodiment, the internal contour 72 of the bushing 70 includes a cylindrical lower portion 84, followed by a frusto-conical portion 86 having a tapering inner surface 87 that extends upward and radially inward as it extends toward the fan motor 78. The frusto-conical portion 86 connects the cylindrical lower portion 84 and another cylindrical portion 88 having a close fit to the outer surface of the shaft 76. An upper cylindrical portion 90 is located above the cylindrical portion 88 having larger a diameter that is larger than cylindrical portion 88. This difference in diameter provides a seating surface 91 upon which an o-ring seal 74 may be positioned.

The o-ring seal 74 is tightly fitted to the fan shaft 76. The o-ring seal 74 is installed on the fan shaft 76 so that as the bushing 70 is tightened it locates the position of the o-ring 74 on the shaft 76 maintaining a face contact with the bushing 70, which provides a seal between the bushing and the o-ring seal 74. When assembly is complete the o-ring 74 maintains face contact with the bushing 70 and rotates with the fan shaft 76. This inhibits various vapors from reaching the motor. If the o-ring seal 74 happens to migrate away from its seating surface 91, the o-ring seal can act on upwardly migrating water, dispersing the water radially outward so that it will drop downward under the force of gravity through the bushing 70 rather than continue to migrate upward to the fan motor 78. The threaded bushing 70 also serves as a fastener, securing the fan assembly to the oven chamber top 100 via engagement with a nut 80 welded (see weld 94) to a fan support 82. A threaded connection 92 is provided between an external threaded surface 95 of the bushing 70 and the internally threaded nut. A static o-ring seal 96 is provided between a bottom flange 98 of the bushing 70 and top 100 of the oven chamber. The static o-ring seal 96 inhibits passage of liquid and vapor between the bushing 70 and top opening 102 through which the bushing is located.

The fan shaft arrangement provides an effective seal to prevent liquids and vapors from reaching the fan motor. This result may be accomplished without adding additional load to the motor. The rotisserie oven can be stacked as shown in FIG. 1, located on a stand as shown by FIG. 2, located atop a counter, located atop a combination oven, located atop a convection oven, etc.

It is to be clearly understood that the above description is intended by way of illustration and example only, is not intended to be taken by way of limitation, and that other changes and modifications are possible.

What is claimed is:
1. A self-cleaning rotisserie oven, comprising:
 a cooking cabinet comprising an internal bottom wall, an internal top wall and internal side walls thereby defining a cooking chamber;
 a self-cleaning system for cleaning the cooking chamber; and
 a convection system including a heating element and ventilation system configured to heat the cooking chamber, the ventilation system including:
 a motor;
 a fan including a fan shaft having a first end connected to the motor and a protruding end connected to the fan such that the motor drives the fan; and
 a bushing including a central channel that receives the fan shaft, the central channel including an inner surface having a variable inner diameter along an axial length of the bushing such that a first portion of the inner surface is near the fan shaft and a second portion of the inner surface is spaced apart from and further from the fan shaft than the first portion, the second portion positioned toward the protruding end of the fan shaft and the first portion positioned toward the first end.

2. The self-cleaning rotisserie oven of claim 1, wherein the bushing includes a threaded outer surface that is threaded into a nut member welded to a fan support, the fan support located above the internal top wall of the cooking chamber.

3. The self-cleaning rotisserie oven of claim 2, wherein the bushing extends through an opening of the internal top wall of the cooking chamber.

4. The self-cleaning rotisserie oven of claim 3, wherein the bushing includes a radially extending flange having a dimension greater than that of the opening in the internal top wall, the flange seating against a cooking chamber facing surface of the internal top wall.

5. The self-cleaning rotisserie oven of claim 4, wherein the central channel includes:
 a lower cylindrical region defining the second portion, the lower cylindrical region having a substantially constant diameter along its axial length;
 a close-fit cylindrical region defining the first portion, the close-fit cylindrical portion having a substantially constant diameter along its axial length, the diameter of the close-fit cylindrical region being less than the diameter of the lower cylindrical region; and a frusto-conical region of varying diameter, a first end of the frusto-conical region having a diameter substantially the same as the diameter of the close-fit cylindrical region and a second, opposite end of the frusto-conical region having a diameter substantially the same as the diameter of the lower cylindrical region.

6. The self-cleaning rotisserie oven of claim 5 further comprising an upper cylindrical region located above the close-fit cylindrical region and having a diameter greater than that of the close-fit cylindrical region.

7. The self-cleaning rotisserie oven of claim 6 further comprising an o-ring seal located about the fan shaft, the o-ring seal seated against a seating surface of the bushing within the upper cylindrical region, the o-ring connected to the fan shaft such that it rotates with the fan shaft.

8. The self-cleaning rotisserie oven of claim 4 further comprising a static o-ring seal located between the flange and the top wall of the oven chamber.

9. The self-cleaning rotisserie oven of claim 2, wherein the motor is supported by the fan support, the fan support having an opening through which the fan shaft extends.

10. A self-cleaning rotisserie oven, comprising:
a cooking cabinet comprising an internal bottom wall, an internal top wall and internal side walls thereby defining a cooking chamber;
a rotor located in the cooking chamber;
a self-cleaning system for cleaning the cooking chamber;
a fan motor located on a fan support located above the internal top wall of the cooking chamber;
a fan including a fan shaft connected to the motor such that the motor drives the fan, the fan shaft extending through an opening in the fan support and an opening in the top wall;
a nut member attached to a cooking chamber facing surface of the fan support, the nut member having an opening extending therethrough aligned with the opening in the fan support such that the fan shaft passes through the opening in the nut member; and
a bushing threadably connected to the nut member and having a channel through which the fan shaft passes, the bushing extending through the opening in the top wall and including a radially extending flange located adjacent an oven chamber facing surface of the top wall and wherein the said bushing includes a central channel that receives the fan shaft, the central channel including an inner surface having a variable inner diameter along an axial length of the bushing such that a first portion of the inner surface is near the fan shaft and a second portion of the inner surface is further from the fan shaft than the first portion.

11. The self-cleaning rotisserie oven of claim 10, wherein the central channel includes:
a lower cylindrical region defining the second portion, the lower cylindrical region having a substantially constant diameter along its axial length;
a close-fit cylindrical region defining the first portion, the close-fit cylindrical portion having a substantially constant diameter along its axial length, the diameter of the close-fit cylindrical region being less than the diameter of the lower cylindrical region; and
a frusto-conical region of varying diameter, a first end of the frusto-conical region having a diameter substantially the same as the diameter of the close-fit cylindrical region and a second, opposite end of the frusto-conical region having a diameter substantially the same as the diameter of the lower cylindrical region.

12. The self-cleaning rotisserie oven of claim 11 further comprising an upper cylindrical region located above the close-fit cylindrical region and having a diameter greater than that of the close-fit cylindrical region.

13. The self-cleaning rotisserie oven of claim 12 further comprising an o-ring seal located about the fan shaft, the o-ring seal seated against a seating surface of the bushing within the upper cylindrical region, the o-ring connected to the fan shaft such that it rotates with the fan shaft.

14. The self-cleaning rotisserie oven of claim 10, wherein the radially extending flange has a dimension greater than the opening in the top wall, the flange seating against a cooking chamber facing surface of the internal top wall.

15. The self-cleaning rotisserie oven of claim 14 further comprising a static o-ring seal located between the flange and the top wall of the oven chamber.

16. A method of inhibiting leak along a fan shaft within a self-cleaning rotisserie oven including a cooking cabinet comprising an internal bottom wall, an internal top wall and internal side walls thereby defining a cooking chamber, a rotor located in the cooking chamber and a self-cleaning system for cleaning the cooking chamber, the method comprising:
supporting a fan motor on a fan support located above the internal top wall of the cooking chamber, a fan shaft operatively connected to the fan motor, the fan shaft extending through an opening in the fan support and through an opening in the top wall;
locating the fan shaft within a channel in a bushing; and
inserting the bushing through the opening in the top wall by moving the bushing along an axis of the fan shaft, the channel of the bushing including an inner surface having a variable inner diameter along an axial length of the bushing such that a first portion of the inner surface is near the fan shaft and a second portion of the inner surface is further from the fan shaft than the first portion,
connecting the bushing to the fan support by threading the bushing into a nut member connected to the fan support, and
placing an o-ring seal in an upper recess of the bushing and locating the fan shaft within an opening in the o-ring seal, the o-ring seal being seated in the upper recess such that moving the bushing along the axis of the fan shaft moves the o-ring seal along the fan shaft to a position along the fan shaft.

17. A self-cleaning rotisserie oven, comprising:
a cooking cabinet comprising an internal bottom wall, an internal top wall and internal side walls thereby defining a cooking chamber;
a self-cleaning system for cleaning the cooking chamber; and
a convection system including a heating element and ventilation system configured to heat the cooking chamber, the ventilation system including:
a motor;
a fan including a fan shaft having connected to the motor such that the motor drives the fan; and
a bushing including a central channel that receives the fan shaft, the central channel including an inner surface having a variable inner diameter along an axial length of the bushing such that a first portion of the inner surface is near the fan shaft and a second portion of the inner surface is further from the fan shaft than the first portion wherein the central channel includes:
a lower cylindrical region defining the second portion, the lower cylindrical region having a substantially constant diameter along its axial length;

a close-fit cylindrical region defining the first portion, the close-fit cylindrical portion having a substantially constant diameter along its axial length, the diameter of the close-fit cylindrical region being less than the diameter of the lower cylindrical region; and a frusto-conical region of varying diameter, a first end of the frusto-conical region having a diameter substantially the same as the diameter of the close-fit cylindrical region and a second, opposite end of the frusto-conical region having a diameter substantially the same as the diameter of the lower cylindrical region.

\* \* \* \* \*